(12) United States Patent
Wu et al.

(10) Patent No.: US 8,293,686 B2
(45) Date of Patent: Oct. 23, 2012

(54) EMULSIFIED POLYMER DRILLING FLUID AND METHODS OF PREPARATION

(75) Inventors: An-Ming Wu, Calgary (CA); Jay Brockhoff, Calgary (CA)

(73) Assignee: Marquis Alliance Energy Group Inc., Calgary (CA)

( * ) Notice: Subject to any disclaimer, the term of this patent is extended or adjusted under 35 U.S.C. 154(b) by 0 days.

(21) Appl. No.: 13/118,523

(22) Filed: May 30, 2011
(Under 37 CFR 1.47)

(65) Prior Publication Data
US 2011/0230376 A1 Sep. 22, 2011

Related U.S. Application Data

(60) Division of application No. 11/621,436, filed on Jan. 9, 2007, now Pat. No. 7,951,755, which is a continuation-in-part of application No. 10/722,529, filed on Nov. 28, 2003, now abandoned.

(60) Provisional application No. 60/430,051, filed on Dec. 2, 2002.

(51) Int. Cl.
*C09K 8/04* (2006.01)
*C09K 8/08* (2006.01)
*C09K 8/10* (2006.01)

(52) U.S. Cl. ........ 507/136; 507/110; 507/111; 507/112; 507/117; 507/126; 507/127; 507/139; 507/143; 507/263; 175/65

(58) Field of Classification Search .................. None
See application file for complete search history.

(56) References Cited

U.S. PATENT DOCUMENTS

| | | | |
|---|---|---|---|
| 2,288,857 | A | 7/1942 | Subkow |
| 3,245,934 | A | 4/1966 | Krzyszkowski |
| 3,577,249 | A | 5/1971 | Dybalski |
| 3,706,341 | A | 12/1972 | Redford |
| 4,122,029 | A | 10/1978 | Gee et al. |
| 4,189,184 | A | 2/1980 | Green |
| 4,376,700 | A | 3/1983 | Irons |
| 4,645,514 | A | 2/1987 | Lane |
| 4,861,612 | A | 8/1989 | Nakano et al. |

(Continued)

FOREIGN PATENT DOCUMENTS

CA 1271320 7/1990

(Continued)

OTHER PUBLICATIONS

Definition of "bitumen" from Schlumberger Oilfield Glossary, http://www.glossary.oilfield.slb.com/Display.cfm?Term=bitumen, 2002.

(Continued)

*Primary Examiner* — John J Figueroa
(74) *Attorney, Agent, or Firm* — Donald V. Tomkins

(57) ABSTRACT

A water-based polymer drilling fluid, containing effective quantities of surfactants having HLB numbers equal to or greater than approximately 7, emulsifies oil and bitumen contained in oil sand cuttings, resulting in the oil and bitumen being dispersed into the mud as an emulsion. This eliminates or significantly reduces the ability of the oil, bitumen, and cuttings to clog the well or stick to drill string components when drilling a well through oil-bearing sands, particularly sands containing highly viscous oil or bitumen. The emulsification process separates the sand particles from the oil and bitumen, such that the sand particles can be removed when the mud is run through a conventional shale shaker or other suitable apparatus.

32 Claims, 1 Drawing Sheet

| | Typical | High Vis | High Vis | High Vis | High Vis | High Vis | Low Vis | Low Vis | Low Vis | Low Vis | Low Vis |
|---|---|---|---|---|---|---|---|---|---|---|---|
| Xanthan | 1-2 | 4-8 | 4-8 | 1-2 | 1-2 | 1-2 | 0 | 0.25-1.0 | 0.25-1.0 | 0 | 0.25-1.0 |
| PAC | 2-4 | 4-6 | 2-3 | 4-10 | 2-3 | 2-3 | 1-2 | 0 | 1-2 | 1-2 | 1-2 |
| Starch | 4-10 | 10-20 | 4-8 | 4-8 | 10-20 | 4-8 | 0-4 | 2-4 | 0 | 0 | 2-4 |
| Clay | 15-20 | 15-20 | 15-20 | 15-20 | 15-20 | 30-40 | 0 | 0 | 0 | 10-15 | 10-15 |

EXEMPLARY VISCOSITY AGENT AND FLUID-LOSS AGENT
COMBINATIONS AND CONCENTRATIONS
(kg per cubic meter)

U.S. PATENT DOCUMENTS

| | | |
|---|---|---|
| 5,064,694 A | 11/1991 | Gee |
| 5,552,377 A | 9/1996 | Kindred |
| 5,634,984 A | 6/1997 | Van Slyke |
| 5,684,085 A | 11/1997 | Gee et al. |
| 5,723,423 A | 3/1998 | Van Slyke |
| 6,060,434 A | 5/2000 | Sweatman et al. |
| 6,194,355 B1 | 2/2001 | Jarrett et al. |
| 6,224,534 B1 | 5/2001 | Limia et al. |
| 6,267,716 B1 | 7/2001 | Quintero |
| 6,620,769 B1 | 9/2003 | Juppe et al. |
| 6,817,426 B2 | 11/2004 | Quintero |
| 6,838,485 B1 | 1/2005 | Quintero |
| 6,846,420 B2 | 1/2005 | Reddy et al. |
| 2009/0011960 A1 | 1/2009 | Wu |

FOREIGN PATENT DOCUMENTS

| | | |
|---|---|---|
| EP | 0084411 | 7/1983 |
| EP | 1103589 | 5/2001 |
| EP | 1104798 | 6/2001 |
| GB | 592754 B1 | 9/1947 |

OTHER PUBLICATIONS

Definition of "asphalt" from Schlumberger Oilfield Glossary, http://www.glossary.oilfield.slb.com/Display.cfm?Term=asphalt, 2002.

| | Typical | High Vis | High Vis | High Vis | High Vis | High Vis | Low Vis | Low Vis | Low Vis | Low Vis | Low Vis |
|---|---|---|---|---|---|---|---|---|---|---|---|
| Xanthan | 1-2 | 4-8 | 4-8 | 1-2 | 1-2 | 1-2 | 0 | 0.25-1.0 | 0.25-1.0 | 0 | 0.25-1.0 |
| PAC | 2-4 | 4-6 | 2-3 | 4-10 | 2-3 | 2-3 | 1-2 | 0 | 1-2 | 1-2 | 1-2 |
| Starch | 4-10 | 10-20 | 4-8 | 4-8 | 10-20 | 4-8 | 0-4 | 2-4 | 0 | 0 | 2-4 |
| Clay | 15-20 | 15-20 | 15-20 | 15-20 | 15-20 | 30-40 | 0 | 0 | 0 | 10-15 | 10-15 |

EXEMPLARY VISCOSITY AGENT AND FLUID-LOSS AGENT COMBINATIONS AND CONCENTRATIONS
(kg per cubic meter)

EMULSIFIED POLYMER DRILLING FLUID AND METHODS OF PREPARATION

CROSS-REFERENCE TO RELATED APPLICATIONS

This application is a division, pursuant to 35 U.S.C. 120, of application Ser. No. 11/621,436, filed on Jan. 9, 2007, now U.S. Pat. No. 7,951,755, which was a continuation-in-part, pursuant to 35 U.S.C. 120, of application Ser. No. 10/722,529, filed on Nov. 28, 2003 now abandoned, which claimed the benefit, pursuant to 35 U.S.C. 119(e), of Application No. 60/430,051, filed on Dec. 2, 2002, and all said applications are incorporated herein by reference in their entireties for continuity of disclosure.

FIELD OF THE INVENTION

The present invention relates to drilling fluids for use in drilling oil and gas wells, and in particular to drilling fluids for use in drilling through oil sand formations.

BACKGROUND OF THE INVENTION

Drilling Fluids Generally

Oil and gas wells are most commonly drilled using the rotary drilling method. In this method, a drill bit with fixed or rotatable cutting teeth is mounted at the lower end of a drill string, which is an assembly of drill pipe, drill collars, and other drilling accessories. The drill string is typically rotated by means of either a rotary table or a top drive apparatus associated with the drilling rig. In some cases, the drill string is rotated by what is commonly referred to as a mud motor. Whatever means of rotation is used, the rotation of the drill string causes the drill bit to bore into the ground. Additional sections of drill pipe are added to the drill string as the well is drilled deeper, until the desired depth is reached. The cutting diameter of the drill bit is larger than the diameter of the drill string components, so the drilling operation creates an annular space between the drill string and the earthen sides of the wellbore.

During rotary drilling operations, a slurry mixture called drilling fluid (commonly referred to as "drilling mud") is circulated continuously down through the drill string, out the bottom of the drill string (through nozzles or jets near the cutting teeth of the drill bit) into the annular space between the drill string and the wellbore, and then back up to the surface. Drilling mud serves a number of important functions in the drilling operation. Of primary importance, the mud carries bored material (commonly called "cuttings") out of the wellbore and up to the surface, so that the cuttings do not clog the wellbore and impede further drilling. In a typical drilling operation, the mud returning from the wellbore is processed through various types of cleaning equipment, such as shale shakers, centrifuges, desilters, desanders, degassers, settling chambers, and other apparatus well known in the well drilling industry. This process removes cuttings, formation gas, and other contaminants so that the cleaned and conditioned mud can be reused.

Drilling mud also lubricates and cools the drill bit, further facilitating efficient drilling operations. As well, drilling mud can serve the important function of preventing a blow-out if a well is drilled into a subsurface formation that contains high pressure. The weight of the column of mud in and around the drill string exerts hydrostatic pressure on the bottom of the well, proportionate to the density of the mud and the height of the mud column. If this pressure is great enough, it will counteract the formation pressure so that a blow-out cannot occur. The hydrostatic pressure exerted by the mud also helps to prevent unwanted materials from infiltrating the wellbore, a consideration which is particularly important when drilling through formations containing loose or easily fractured materials.

Another valuable function of drilling mud is formation protection. Properly formulated, drilling mud remains fluid as long as it is in constant circulation, but may form a gel or become more thixotropic when not being circulated. Because of these characteristics, as the mud is being circulated by the mud pumps, it will adhere to and solidify on the borehole walls, lining the hole with a thin protective cake that prevents or minimizes the risk of loose or disturbed formation materials sloughing into the well.

Oil-based drilling muds (or "oil muds") may be necessary or beneficial in certain circumstances, such as when drilling through formations containing expansive clays that swell upon contact with water. However, water-based drilling muds (also called "water muds") are used much more commonly. Besides water, the main ingredient of a typical water mud is a viscosity agent, usually a fine-grained clay, which mixes with the water to form a slurry. Bentonite, which consists predominantly of an expansive clay called montmorillonite, is widely used in water muds, although other types of clay may be used as well.

The clay also increases the density of the mud, thus enhancing its effectiveness for blow-out protection. Various other weighting materials, such as barite, hematite, or calcium carbonate, may also be added for this purpose.

Other substances which may be added to drilling muds, depending on the intended application and desired properties of the mud include drilling detergents, foaming agents, defoaming agents, and alkaline materials (for counteracting acidic contaminants which may enter the mud).

It is also common to add natural or synthetic polymer materials to water muds, for one or more purposes. The behaviour and effect of a polymer in a drilling mud generally depend on the size of the polymer's molecules and their charge (e.g., anionic, cationic, or non-ionic). Some polymers may have the beneficial effect of minimizing loss of fluid from the mud. Some polymers may decrease the viscosity of the mud, while others may act to cause flocculation of the clay in the mud, thus increasing viscosity. Some polymers may serve multiple functions. Water muds that have significant polymer content may also be referred to as polymer drilling fluids.

An oil, such as diesel oil or mineral oil, is commonly added to enhance a water mud's lubricating characteristics. As oils are insoluble (or "immiscible") in water, they may be dispersed into the mud as emulsions. When an oil is emulsified into an aqueous carrier fluid (e.g., water, or water mud), the oil is broken up into many small particles or droplets which become uniformly dispersed, in suspension, throughout the fluid. Without emulsification, the particles or droplets would simply re-agglomerate due to attractive forces between the molecules, and the oil would separate from the water as a discrete liquid phase.

One or more chemical emulsifying agents (or "emulsifiers") are commonly used to emulsify oils in drilling mud. Emulsifiers work by reducing the interfacial tension between the molecules of immiscible liquids. Some emulsifiers fall into the category of surface-active chemical agents called surfactants. Not all surfactants are emulsifiers, however. There are many different types of surfactants, and they may be added to drilling muds for various purposes, depending on the surfactants' particular characteristics. Surfactants are commonly classified according to their hydophile-lipophile balance (HLB) numbers. HLB numbers (which are determined on a scale of 1 to 40) provide a semi-empirical method of predicting the type of properties a surfactant will exhibit, depending on its molecular structure.

A hydrophilic molecule or material is one which has a surficial affinity for water. Clays, like bentonite, which are readily wetted by water, are hydrophilic materials. In contrast, a lipophilic molecule or material is one that has a surficial affinity for oils or oily substances. A surfactant that is effective to emulsify an oil in water will typically have a fairly high HLB number, whereas a surfactant effective in emulsifying water in oil will typically have a fairly low HLB number. Accordingly, the selection of surfactants to be used as additives in drilling muds will involve consideration of HLB numbers, depending on desired surfactant properties and effects.

Problems with Known Drilling Fluids

Water muds, in diverse known formulations, perform satisfactorily in many applications. However, a particular problem arises when drilling through oil-bearing sand formations, such as those which occur extensively in northern Alberta. These oil sand formations contain vast reserves of oil, but the oil is thick and heavy and therefore difficult to recover. Considerable success in heavy oil recovery from Alberta's oil sands has been achieved in recent decades by means of innovative methods of in-plant processing of oil sand excavated in bulk using open-pit mining techniques. However, the usefulness of such methods is limited to recovery from oil sand formations that are close enough to the surface for open-pit mining to be practical. Recovery from deeper oil sand formations requires an entirely different approach.

Conventional production well technology, which relies on crude oil flowing by gravity and/or pressure into production wells, does not work well or at all in bituminous oil sand formations. Being quite thick and heavy, the oil in these formations is typically too viscous, in its natural state, to flow out of the sand. If its viscosity is low enough to permit gravity flow, recovery rates tend to be very low. However, recovery of heavy oil from such formations can be significantly enhanced using a relatively new technology called steam-assisted gravity drainage (or "SAGD", as it is commonly known in the industry).

SAGD is fairly simple in concept. Using well-known directional drilling methods, a horizontal production well is drilled through an oil sand formation. A steam-injection well with a perforated liner is drilled above and substantially parallel to the production well. Superheated steam is then injected into the oil sand formation (either at the heel and/or toe of the liner or through the perforations in the liner of the injection well), thereby heating the oil or bitumen in an affected region of the formation (or "steam chamber") generally extending upward and outward from the injection well. This heating effect causes the oil or bitumen in the steam chamber to become less viscous, such that it will flow by gravity and/or pressure through the sand and into the production well through perforations in the production well liner, whereupon it can be pumped or raised to the surface using conventional methods.

Like other types of well-drilling operations, the drilling of SAGD wells entails the use of drilling mud. However, drilling in bituminous oil sand formations poses a number of practical problems that are not satisfactorily addressed by prior art drilling mud technology. The cuttings contain significant amounts of heavy oil or bitumen, which can clog the shale shaker screens and other mud-processing equipment. As a result, effective removal of cuttings from the mud is more difficult, and the ability to clean and reuse the mud is reduced or even precluded. This increases mud costs, because new mud must be added to the mud system to replace mud that cannot be effectively cleaned and must therefore be discarded. This gives rise to the further problem of disposal of the discarded mud, laden with substantial quantities of sand coated with heavy oil and bitumen. Disposal of this contaminated mud is considerably more difficult, from both practical and environmental standpoints, than disposing of the comparatively clean particulate material removed from the mud in more conventional drilling operations.

Furthermore, the cuttings are very sticky because of the thick oil and bitumen, and they tend to stick to the drilling pipe, well casing, and liners. The presence of these sticky cuttings in the mud increases drag forces on the drill string components, thereby increasing the power and torque required to rotate the drill string, increasing wear and tear on the rig's drive mechanism, and increasing rig service and maintenance requirements. The sticky cuttings and bitumen cause particular problems when running liners into a horizontal well, because they tend to build up in curved casing sections where the well changes direction from vertical to horizontal, often making it necessary to clear the build-up before it will be possible to run the liners into the horizontal section without difficulty.

These problems can be mitigated to some extent by circulating the bitumen-laden mud through a large mud cooler. This cools the bitumen in the mud to the point that it is no longer sticky enough to adhere to well components. The major drawback to this solution is expense, as the cost of operating a mud cooler can commonly be several thousand dollars per day.

The inventors are aware of one attempt to reduce the problem of bitumen-laden cuttings sticking to well components, by using a polymer drilling fluid containing approximately 0.3% by weight of a non-ionic surface-active agent called HME ENERGIZER® sold by Montello, Inc. of Tulsa, Okla. HME ENERGIZER® consists of about 10% to 30% surfactants and 70% to 90% hydrocarbon solvent, so the mud system treated with HME ENERGIZER® contained between 0.3 and 0.9 kilograms of surfactant per cubic meter of mud. However, this formulation did not prove effective. In such low concentrations, the HME ENERGIZER® could not emulsify oil and bitumen from the cuttings, and in higher concentrations it would make the mud too thick to be used in the field.

U.S. Pat. No. 5,634,984 (Van Slyke) discloses a cleaning fluid that incorporates surfactants having HLB numbers of at least about 8, and which is stated to be usable for cleaning oil-contaminated substrates, including oil-contaminated drill cuttings. The Van Slyke patent indicates that this fluid can also be incorporated into a drilling fluid, but it contemplates such use only in association with oil-based drilling fluids. The Van Slyke specification states that the oil-to-water ratio of drilling fluids incorporating the cleaning fluid can be as low as 50:50 by volume, while also stating that compositions of the cleaning fluid commonly contain less than 20 percent water and preferably less than 0.5 percent water. It is therefore readily apparent that while the Van Slyke compositions might be effective in certain applications, the Van Slyke patent does not address the problems caused by bitumen-laden cuttings in the specific context of water-based drilling fluids.

For the foregoing reasons, there is a need for a water-based drilling fluid that can be used for rotary drilling operations in oil sand formations, and which is capable of effectively removing oil- and bitumen-laden cuttings without the cuttings or the oil or bitumen contained therein adhering to drill string components and associated downhole equipment, in detrimental quantities or at all; without significantly increasing or decreasing the thickness or viscosity of the drilling fluid; with minimal or no increase in drag forces acting on the drill string; with minimal or no increase in the power needed to rotate the drill string; without reducing, significantly or at all, the suitability of the drilling fluid to be effectively cleaned using conventional mud-cleaning apparatus, and then reused in well-drilling operations; and without requiring the use of mud-cooling equipment to achieve these characteristics. The present invention is directed to these needs.

BRIEF SUMMARY OF THE INVENTION

In general terms, the invention is a water-based polymer drilling mud which emulsifies all or a substantial portion of the oil and bitumen contained in oil sand cuttings, resulting in the oil and bitumen being dispersed into the mud as an emulsion. This eliminates or significantly reduces the ability of the oil, bitumen, and cuttings to clog the well or stick to drill string components. The emulsification process separates the sand particles from the oil and bitumen, such that the sand particles can be removed when the mud is run through a conventional shale shaker or other suitable apparatus well known in the art.

The inventors have found that emulsification of the oil and bitumen in oil sand cuttings in a water-based drilling mud may be induced by the introduction of effective quantities of different surfactants having HLB numbers equal to or greater than approximately 7. The compositions and concentrations of such surfactants required for practical effectiveness will vary with the characteristics and concentrations of oil or bitumen in the cuttings, as well as the concentrations of oil or bitumen emulsified in the mud. However, it has been found that the required concentration will generally be at least 0.1 kg of surfactants (with HLB equal to or greater than approximately 7) per cubic meter of drilling mud.

The drilling fluid of the present invention, having been pumped out of an oil sand well and back to the surface, can be dewatered by adding suitable materials such as calcium, anionic or nonionic polymers, and/or cationic polymers, and then centrifuged in order to remove the unwanted cuttings.

Accordingly, in one aspect the present invention is a drilling fluid comprising an aqueous liquid, one or more viscosity agents, and one or more surfactants having HLB numbers equal to or greater than approximately 7. In the preferred embodiment, the aqueous liquid will be water, which typically will be fresh water, but alternatively may be brine water or formation water (i.e., water naturally occurring in a formation through which a well is being drilled). In preferred embodiments, the drilling fluid will have a water content in the range of 75 to 95 percent by volume.

The drilling fluid will tend to have a density in the range of 1,000 to 1,050 kilograms per cubic meter. However, the density may be outside this range without departing from the scope of the invention.

The drilling fluid may also include one or more of the following constituents: polymer materials, alkaline materials, a carrier oil having solvent properties, weighting materials, and defoaming agents. As used in this patent specification, a carrier oil having solvent properties means an oil with properties rendering it effective to enhance the drilling fluid's ability to emulsify the bitumen into the drilling fluid.

The drilling fluid may also contain emulsified oil or other bituminous material derived from cuttings produced when drilling through oil sand formations.

In a second aspect, the present invention is a process for making an emulsified drilling fluid containing emulsified oil or bitumen from oil sand cuttings, said process comprising the steps of:
  providing a primary drilling fluid comprising an aqueous liquid, one or more viscosity agents, and one or more surfactants having HLB numbers equal to or greater than approximately 7; and
  mixing the primary drilling fluid with cuttings produced by drilling through oil sand formations containing oil or bitumen;
wherein said surfactants are effective to emulsify oil or bitumen from the cuttings, and the emulsified oil or bitumen becomes substantially uniformly dispersed within the primary drilling fluid, thereby forming the emulsified drilling fluid. In the preferred embodiment of the process, the step of mixing the primary drilling fluid with cuttings will be accomplished by circulating the primary drilling fluid through the annular space of the wellbore of a well being drilled through an oil sand formation, such that cuttings from the oil sand formation become mixed into the primary drilling fluid.

In alternative embodiments of the process of the invention, the primary drilling fluid may also include one or more of the following constituents: polymer materials, alkaline materials, a carrier oil having solvent properties, weighting materials, and defoaming agents.

In addition to the benefits of the embodiments described above, the inventors have also discovered that emulsification of the oil and bitumen in oil sand cuttings in a water-based drilling mud may be induced by the introduction of effective quantities of a carrier oil having solvent properties, with or without the additional presence of surfactants. Accordingly, in a third aspect, the present invention is a drilling fluid comprising an aqueous liquid, one or more viscosity agents, and a carrier oil having solvent properties. In the preferred embodiment of this aspect of the invention, the concentration of carrier oil will be in the range between 5 and 75 kg per cubic meter of drilling fluid.

The drilling mud may also include one or more of the following constituents: polymer materials, alkaline materials, a carrier oil having solvent properties, weighting materials, and defoaming agents. The drilling fluid may further contain emulsified oil or other bituminous material derived from cuttings produced when drilling through oil sand formations.

BRIEF DESCRIPTION OF THE DRAWING

Embodiments of the invention will now be described with reference to the accompanying FIG. 1, which is a chart illustrating exemplary combinations of viscosity and fluid-loss control agents for use in formulations of drilling fluids in accordance with the present invention.

DETAILED DESCRIPTION OF THE PREFERRED EMBODIMENT

The essential and optional constituents of the drilling fluids of the present invention have been set out above. The invention does not require these constituents to be combined in specific relative proportions or set formulations. The proportions of each constituent, as well as the selection of optional constituents, will be variable depending on the particular characteristics of the subsurface materials through which a well using the drilling fluid is being drilled, and also depending on particular drilling fluid characteristics that the user may wish to obtain. However, typical ranges for the concentrations of the various constituents are set out below, along with examples of specific materials that may be used for the constituents.

In preferred embodiments of the drilling fluid of the invention, the viscosity agent may be PAC (polyanionic cellulose), clay, starch, or xanthan gum. Where a clay is used as a viscosity agent, it will be a clay of a type adapted for or known in the field of the invention as being suitable for use in drilling fluids. The concentration of viscosity agents will be in the range from 0.1 kg to 100 kg per cubic meter of drilling fluid. Where a clay is used as the viscosity agent, its concentration of clay will preferably be in the range of 10 to 40 kg per cubic meter.

In the preferred embodiment, the concentration of surfactants having HLB numbers equal to or greater than approximately 7 will be in the range between 0.1 kg and 60 kg per cubic meter of drilling fluid. In the preferred embodiment, the concentration of such surfactants will be in range of 2.5 to 25 kg per cubic meter. The surfactants having HLB numbers equal to or greater than approximately 7 may be selected from a group of anionic surfactants and nonionic surfactants which includes but is not limited to carboxylate salts, sulfonides, sulphates, phosphates, polyethyoxylate ether, alkylphenol ethoxylates, alcohol ethoxylates, fatty acid ethoxylates, ethoxylated alkanolamide, alkyl ether phosphate, alkyl benzene sulfonates, ethoxylated fatty acids, castor oil ethoxylates, glycerol esters, ethylene oxide propylene oxide-block copolymers, nonylphenoxypoly (ethyleneoxy) ethanol, imidazolines, betaines, propionates, and amphoacetates.

Particularly beneficial results have been obtained using surfactants having HLB numbers in a range between approximately 7 and approximately 13. One specific example of such surfactants is IGEPAL® CO-430, which may be chemically described as a nonyl phenol 4 mole ethoxylate, and which has an HLB number of approximately 8.3. A further example is IGEPAL® CA-520, which may be chemically described as an octyl phenol 5 mole ethoxylate, and which has an HLB number of approximately 10. These particular surfactants are manufactured by the Stepan Company, Inc., of Burlington, Ontario, Canada.

The drilling fluid may also contain one or more polymer materials, for further controlling viscosity and for controlling fluid loss into the formation. Such polymer materials may include but not be limited to clay, PAC, guar gum, natural organic polymers, synthetic polymers, and HEC (hydroxyethlycellulose). Where used, the starch may be a modified starch, or a non-modified starch such as potato starch or corn starch. The total concentration of polymers, where used, will be in the range between 0.1 kg and 50 kg per cubic meter of drilling fluid. In the preferred embodiment, the concentration of polymers will be in the range of 1.0 to 25 kg per cubic meter.

As illustrated by way of the examples in FIG. 1, the viscosity of the drilling fluid will vary according to the types and concentrations of viscosity agents selected. FIG. 1 shows various combinations and concentrations of xanthan gum, PAC, starch, and clay, and the relative viscosity obtained in each case. The leftmost column ("Typical") in FIG. 1 illustrates combinations and concentrations of these four materials that have been found to be effective in a broad range of applications. The next five columns ("High Vis") show combinations and concentrations that have been found to produce higher viscosities, and the last five columns ("Low Vis") show combinations that produce lower viscosities.

Although each combination shown in FIG. 1 includes at least two of the four listed viscosity agents, the drilling fluid of the present invention may effectively use only one of these agents, if relatively low viscosity and high fluid loss are acceptable. However, it has been found the use of at least two of these agents will result in superior drilling fluid performance in most cases. It should be noted as well that HEC and/or guar gum may be used in substitute for xanthan gum, with similar effects on viscosity.

The drilling fluid may also contain one or more alkaline materials, including but not limited to caustic soda (sodium hydroxide) and soda ash (sodium carbonate). The purposes for incorporating alkaline materials into the drilling fluid may include alkalinity control, maintenance of desired pH levels, and/or reduction of hardness. The concentration of alkaline materials, where used, will be in the range between 0.1 kg and 20 kg per cubic meter of drilling fluid. In the preferred embodiment, the concentration of alkaline materials will be in the range of 0.5 to 5 kg per cubic meter.

The drilling fluid may also contain a carrier oil having solvent properties. The carrier oil may include but not limited to HT-40® (manufactured by Petro-Canada), DRILLSOL® (manufactured by Enerchem International Inc., of Nisku, Alberta, Canada), SHELLSOL® (manufactured by Shell Chemical Company), and similar materials. In generic terms, HT-40® is a blend of synthetic isoalkane fluid and severely hydrocracked low-toxicity mineral oil. DRILLSOL® is an oil-based drilling fluid with a flash point greater than 85° centigrade and an aromatic content less than 50 parts per million. SHELLSOL® is a hydrocarbon solvent consisting essentially of isoparaffinic components and characterized by high stability and low odor. The concentration of carrier oil, where used, will be in the range between 0.1 kg and 100 kg per cubic meter of drilling fluid. In the preferred embodiment, the concentration of carrier oil will be in the range of 1.0 to 75 kg per cubic meter.

The drilling fluid may also contain one or more weighting materials, including but not limited to barite, hematite, and calcium carbonate. The concentration of weighting material, where used, will be in the range between 0.1 kg and 1,000 kg per cubic meter of drilling fluid.

The drilling fluid may also contain one or more defoaming agents, including but not limited to alcohol-based and silicone-based defoamers, of types well known in the field of the invention. The concentration of defoaming agents, where used, will be in the range between 0.1 kg and 30 kg per cubic meter of drilling fluid. In the preferred embodiment, the concentration of defoaming agents will be in the range of 0.1 to 15 kg per cubic meter.

The drilling fluid may also comprise emulsified oil or other bituminous material from the cuttings produced in drilling through oil sand, in the range between 0.1 kg and 500 kg per cubic meter of drilling fluid. In the preferred embodiment, the concentration of emulsified oil or bitumen will be in the range of 0.1 to 250 kg per cubic meter. In this embodiment of the invention, the emulsification of oil or bitumen from the cuttings appears to be particularly enhanced by the inclusion of PAC and/or xanthan gum. Although the precise mechanism by which these benefits are achieved is not presently known with certainty, it is believed that the presence of PAC or xanthan gum promotes the encapsulation of bitumen particles, making them more prone to emulsification in the drilling fluid.

It will be readily appreciated by those skilled in the art that various modifications of the present invention may be devised without departing from the essential concept of the invention, and all such modifications are intended to be included in the scope of the claims appended hereto.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A process for making a water-based, emulsified drilling fluid containing emulsified bitumen from oil sand cuttings, said process comprising the steps of:
   (a) providing a primary fluid comprising water, a viscosity agent, and one or more surfactants having HLB numbers equal to or greater than approximately 7 but not exceeding approximately 13; and
   (b) mixing the primary fluid with cuttings produced by drilling through oil sand formations containing bitumen, by circulating the primary fluid through the annular space of a wellbore drilled through an oil sand formation;
wherein said one or more surfactants comprise a nonyl phenol 4 mole ethoxylate and are effective to emulsify the bitumen from oil sand cuttings produced during drilling, and the emulsified bitumen becomes substantially uniformly dispersed within the primary fluid, thereby forming the emulsified drilling fluid.

2. The process of claim 1, wherein the water content of the emulsified drilling fluid is between 75 percent and 95 percent by volume.

3. The process of claim 1, wherein the primary fluid incorporates one or more polymer materials.

4. The process of claim 3, wherein the one or more polymer materials are selected from the group consisting of xanthan gum, polyanionic cellulose, modified starch, and non-modified starch.

5. The process of claim 3, wherein the concentration of polymer materials is in the range from 0.1 to 25 kilograms per cubic meter of drilling fluid.

6. The process of claim 1, wherein the primary fluid incorporates one or more alkaline materials.

7. The process of claim 6, wherein the one or more alkaline materials are selected from the group consisting of sodium hydroxide and sodium carbonate.

8. The process of claim 6, wherein the total concentration of the one or more alkaline materials is in the range from 0.5 to 5 kilograms per cubic meter of drilling fluid.

9. The process of claim 1, wherein the primary fluid incorporates a carrier oil having solvent properties.

10. The process of claim 9, wherein the concentration of the carrier oil is in the range from 0.1 to 75 kilograms per cubic meter of drilling fluid.

11. The process of claim 1, wherein the primary fluid incorporates one or more weighting materials.

12. The process of claim 11, wherein the one or more weighting materials are selected from the group consisting of barite, hematite, and calcium carbonate.

13. The process of claim 11, wherein the concentration of the one or more weighting materials is in the range from 0.1 to 300 kilograms per cubic meter of drilling fluid.

14. The process of claim 1, wherein the primary fluid incorporates one or more defoaming agents.

15. The process of claim 14, wherein the one or more defoaming agents are selected from the group consisting of alcohol-based and silicone-based defoamers.

16. The process of claim 14, wherein the total concentration of defoaming agents is in the range from 0.1 to 15 kilograms per cubic meter of drilling fluid.

17. A process for making a water-based, emulsified drilling fluid containing emulsified bitumen from oil sand cuttings, said process comprising the steps of:
   (a) providing a primary fluid comprising water, a viscosity agent, and one or more surfactants having HLB numbers equal to or greater than approximately 7 but not exceeding approximately 13; and
   (b) mixing the primary fluid with cuttings produced by drilling through oil sand formations containing bitumen, by circulating the primary fluid through the annular space of a wellbore drilled through an oil sand formation;
wherein said one or more surfactants comprise an octyl phenol 5 mole ethoxylate and are effective to emulsify the bitumen from oil sand cuttings produced during drilling, and the emulsified bitumen becomes substantially uniformly dispersed within the primary fluid, thereby forming the emulsified drilling fluid.

18. The process of claim 17, wherein the water content of the emulsified drilling fluid is between 75 percent and 95 percent by volume.

19. The process of claim 17, wherein the primary fluid incorporates one or more polymer materials.

20. The process of claim 19, wherein the one or more polymer materials are selected from the group consisting of xanthan gum, polyanionic cellulose, modified starch, and non-modified starch.

21. The process of claim 19, wherein the concentration of polymer materials is in the range from 0.1 to 25 kilograms per cubic meter of drilling fluid.

22. The process of claim 17, wherein the primary fluid incorporates one or more alkaline materials.

23. The process of claim 22, wherein the one or more alkaline materials are selected from the group consisting of sodium hydroxide and sodium carbonate.

24. The process of claim 22, wherein the total concentration of the one or more alkaline materials is in the range from 0.5 to 5 kilograms per cubic meter of drilling fluid.

25. The process of claim 17, wherein the primary fluid incorporates a carrier oil having solvent properties.

26. The process of claim 25, wherein the concentration of the carrier oil is in the range from 0.1 to 75 kilograms per cubic meter of drilling fluid.

27. The process of claim 17, wherein the primary fluid incorporates one or more weighting materials.

28. The process of claim 27, wherein the one or more weighting materials are selected from the group consisting of barite, hematite, and calcium carbonate.

29. The process of claim 27, wherein the concentration of the one or more weighting materials is in the range from 0.1 to 300 kilograms per cubic meter of drilling fluid.

30. The process of claim 17, wherein the primary fluid incorporates one or more defoaming agents.

31. The process of claim 30, wherein the one or more defoaming agents are selected from the group consisting of alcohol-based and silicone-based defoamers.

32. The process of claim 30, wherein the total concentration of defoaming agents is in the range from 0.1 to 15 kilograms per cubic meter of drilling fluid.

* * * * *